(12) United States Patent
Reed et al.

(10) Patent No.: US 9,633,351 B2
(45) Date of Patent: Apr. 25, 2017

(54) ENCRYPTION SWITCH PROCESSING

(75) Inventors: Judson Reed, San Ramon, CA (US);
Patrick Faith, Pleasanton, CA (US);
Ben Rewis, Oakland, CA (US)

(73) Assignee: Visa International Service Association, San Francisco, CA (US)

( * ) Notice: Subject to any disclaimer, the term of this patent is extended or adjusted under 35 U.S.C. 154(b) by 458 days.

(21) Appl. No.: 12/939,675

(22) Filed: Nov. 4, 2010

(65) Prior Publication Data
US 2011/0106710 A1    May 5, 2011

Related U.S. Application Data

(60) Provisional application No. 61/258,500, filed on Nov. 5, 2009.

(51) Int. Cl.
*G06Q 20/00* (2012.01)
*G06Q 20/38* (2012.01)
(Continued)

(52) U.S. Cl.
CPC ........... *G06Q 20/383* (2013.01); *G06Q 20/20* (2013.01); *G06Q 20/3829* (2013.01);
(Continued)

(58) Field of Classification Search
CPC ............................ G06Q 20/00; G06Q 20/3674
(Continued)

(56) References Cited

U.S. PATENT DOCUMENTS

2002/0178354 A1* 11/2002 Ogg ..................... G06Q 20/382
713/155

2003/0105876 A1* 6/2003 Angelo ................. H04L 63/126
709/237

(Continued)

FOREIGN PATENT DOCUMENTS

AU    WO 9829983 A1 * 7/1998 ............. G06Q 20/04
BY           4860 C1    12/2002
(Continued)

OTHER PUBLICATIONS

International Search Report/Written Opinion of the International Searching Authority of May 26, 2011 in related application PCT/US2010/055652.

(Continued)

*Primary Examiner* — James A Reagan
(74) *Attorney, Agent, or Firm* — Kilpatrick Townsend & Stockton LLP

(57) ABSTRACT

Techniques for eliminating the need for merchants and acquirers to conduct Payment Card Industry ("PCI") security audit procedures are provided. Merchants and acquirers can eliminate the operating expenses associated with conducting audits to ensure compliance with PCI Data Security Standards ("DSS"), while at the same time ensuring that cardholders' data remains secure, thus protecting the cardholders from fraudulent transactions. System security is further enhanced through the use of per transaction audits, with the scope of the audit being directly between the Point of Sale (POS) terminal and the payment processing network. PCI DSS compliance can thus be assured on a per transaction basis, as opposed to only ensuring compliance generally for a merchant or acquirer on a periodic basis. Per transaction PCI DSS compliance is assured, while at the same time eliminating the need for merchants or acquirers to conduct compliance audits.

16 Claims, 10 Drawing Sheets

(51) Int. Cl.
*G06Q 20/20* (2012.01)
*G06Q 20/40* (2012.01)
*H04L 9/32* (2006.01)

(52) U.S. Cl.
CPC .......... *G06Q 20/40* (2013.01); *G06Q 20/401* (2013.01); *H04L 9/3226* (2013.01); *H04L 9/3234* (2013.01); *H04L 2209/56* (2013.01)

(58) Field of Classification Search
USPC .......................................................... 705/67
See application file for complete search history.

(56) References Cited

U.S. PATENT DOCUMENTS

| 2008/0017712 A1* | 1/2008 | Hart ....................... G06K 7/084 235/449 |
| 2008/0109372 A1 | 5/2008 | Bykov et al. |
| 2008/0149718 A1* | 6/2008 | von Mueller ........... G06F 21/72 235/449 |
| 2008/0189214 A1 | 8/2008 | Mueller et al. |

FOREIGN PATENT DOCUMENTS

| CN | 101485128 A | 7/2009 |
| CN | 101512957 A | 8/2009 |
| EP | 1152381 A1 | 11/2001 |
| KR | 10-2005-0042694 A | 5/2005 |
| KR | 10-2006-0025427 A | 3/2006 |
| WO | 0201515 A2 | 1/2002 |
| WO | 2007/149785 A2 | 12/2007 |
| WO | 2008/027642 A2 | 3/2008 |
| WO | 2009003080 A1 | 12/2008 |
| WO | WO 2009/051989 A1 | 4/2009 |

OTHER PUBLICATIONS

Krawczyk, H. et al.; "HMAC: Keyed-Hashing for Message Authentication"; *Internet Engineering Task Force, Network Working Group, Request for Comments: 2104*; Feb. 1997; 11 pages; located at: http://www.ietf.org/rfc/rfc2104.txt.
Krovetz, T.; "UMAC: Message Authentication Code Using Universal Hashing"; *Internet Engineering Task Force, Network Working Group, Request for Comments: 4418*; Mar. 2006, 27 pages; located at: http://www.ietf.org/rfc/rfc4418.txt.
U.S. Department of Commerce; "The Keyed-Hash Message Authentication Code (HMAC)"; *FIPS Pub 198-1, Federal Information Processing Standards Publication*; Jul. 2008; 13 pages; located at : http://csrc.nist.gov/publications/PubsFIPS.html.
Office Action and Search Report dated Sep. 17, 2014 for Chinese Patent Application No. 201080060357.9, 13 pages, with English translation.
English translation of Decision on Grant dated Nov. 12, 2014 in corresponding Russian Application No. 2012123020, 6 pages.
Extended European Search Report, mailed Jul. 14, 2016, in European Application No. 10829158.4, 9 pages.

* cited by examiner

ENCRYPTION SWITCH PROCESSING

CROSS-REFERENCES TO RELATED APPLICATIONS

The present application is a non-provisional of and claims priority to U.S. Provisional Application No. 61/258,500, filed on Nov. 5, 2010, entitled "Encryption Switching for Increased Merchant Value," the entire contents of which are herein incorporated by reference for all purposes.

BACKGROUND

The use of transaction cards, such as credit and debit cards, has become ubiquitous. Consumers have come to rely on the use of transaction cards to purchase goods and services. In many cases, consumers prefer using transaction cards as opposed to alternate forms of payment, such as cash and checks. Transaction cards offer the consumer increased convenience, as the consumer no longer needs to carry cash or checks, which can be lost or stolen, and used inappropriately to engage in transactions that are not approved by the consumer.

The ubiquitous nature of transaction cards, which can also be referred to as payment cards or payment instruments, has led to other problems. Typically, a transaction card is associated with an account identifier, such as an account number, that in turn is associated with an underlying cash account or line of credit, which can be referred to as a transaction account or account. If a fraudulent user is able to obtain the account identifier, the fraudulent user may engage in transactions that are not authorized by the legitimate holder of the transaction card. The consumer can take some steps to ensure that this does not happen. For example, the consumer may take care to always keep the transaction card in a secure place, such as a purse or wallet. The consumer may also notify an issuer of the transaction card if the transaction card is lost or stolen, such that the card may be disabled, and will no longer usable to conduct transactions.

Regardless of the amount of care that a consumer may exercise in the handling of transaction cards, there are still opportunities for an account identifier to be compromised that are completely outside of the control of the consumer. A consumer may engage in a legitimate transaction with a merchant, and as part of that transaction, provide the merchant with the account identifier associated with a transaction card. The merchant may then process the transaction according to conventional means. However, because the merchant, and any downstream processors, such as the merchant's acquirer, have access to the account identifier, the consumer is at the mercy of the security procedures implemented by the merchant or downstream processors. For example, a rogue employee of the merchant may access the merchant's transaction processing system to steal account identifiers. The stolen account identifiers may be used by the rogue employee or others to engage in fraudulent transactions. The exposure of account identifiers through careless handling or lax security procedures can be referred to as a data or security breach.

In order to reduce the likelihood of a data breach, merchants, acquirers, and any other entity that needs to legitimately posses account identifiers as part of normal transaction processing, are required to perform Payment Card Industry ("PCI") Security Audit Procedures to ensure compliance with PCI Data Security Standard ("DSS") requirements for payment card transactions. The purpose of the PCI audit procedures is to ensure that merchants, acquirers, and others in possession of account identifiers have sufficient security within their systems to protect consumers' account identifiers. For example, PCI DSS standards may require that any account identifiers that are stored within a merchant's system must be stored in an encrypted format, and that those systems must be isolated from any general computer network through the use of a firewall.

Although PCI DSS audits provide some degree of protection to a consumer, there are many deficiencies with the process. For example, the audits are typically conducted at a discrete point in time. A merchant may be fully compliant with the PCI DSS at the time the audit is conducted, however the merchant's systems may change at some point after the audit. To alleviate this concern, the merchant may be periodically audited, such as once per calendar quarter. However, as should be clear, this still leaves open the possibility that the merchant is not PCI DSS compliant between audits. Furthermore, there are significant costs associated with maintaining PCI DSS compliance by merchants, acquirers, and any others subject to PCI DSS audits. Aside from the costs of the audit itself, there are ongoing costs with ensuring that any changes made to the payment processing process remain PCI DSS compliant.

Embodiments of the technology disclosed herein address these and other problems, individually and collectively.

BRIEF SUMMARY

Techniques for eliminating the need for merchants and acquirers to conduct Payment Card Industry ("PCI") security audit procedures are provided. Merchants and acquirers can eliminate the operating expenses associated with conducting audits to ensure compliance with PCI Data Security Standards ("DSS"), while at the same time ensuring that cardholders' data remains secure, thus protecting the cardholders from fraudulent transactions. System security is further enhanced through the use of per transaction audits, with the scope of the audit being directly between the Point of Sale (POS) terminal and the payment processing network. PCI DSS compliance can thus be assured on a per transaction basis, as opposed to only ensuring compliance generally for a merchant or acquirer on a periodic basis. Per transaction PCI DSS compliance is assured, while at the same time eliminating the need for merchants or acquirers to conduct compliance audits.

One embodiment of the invention is directed to a system comprising a key database and a transaction processing server computer coupled to the key database. The key database stores keys. The transaction processing server computer comprises a processor and a non-transitory computer readable medium coupled to the processor. The non-transitory computer readable medium comprises code executable by the processor for implementing a method comprising: receiving from a terminal, an envelope associated with a transaction, wherein the envelope includes unencrypted transaction details, a token derived from a key associated with a terminal and an account identifier, and at least a first portion of the transaction details; retrieving the key associated with the terminal from the key database; converting the token to the account identifier using the key; verifying that the account identifier is associated with a valid account; and conducting an audit on the transaction, the audit ensuring that the envelope has not been modified between the terminal and the transaction processing server computer.

Another embodiment is directed to a method comprising: receiving, at a server computer, from a terminal, an envelope associated with a transaction, wherein the envelope includes unencrypted transaction details, a token derived from a key associated with a terminal and an account identifier, and at least a first portion of the transaction details; converting the token to the account identifier; verifying that the account identifier is associated with a valid account; and conducting an audit on the transaction, the audit ensuring that the envelope has not been modified between the terminal and the server computer.

Another embodiment is directed to a method comprising: receiving, at a server computer, a transaction authorization request, the transaction authorization request including an envelope containing at least a portion of transaction details in both an encrypted and an unencrypted format; and forwarding the authorization request to obtain authorization for the transaction.

These and other embodiments of the invention are described in further detail below.

DETAILED DESCRIPTION

Figure 1:
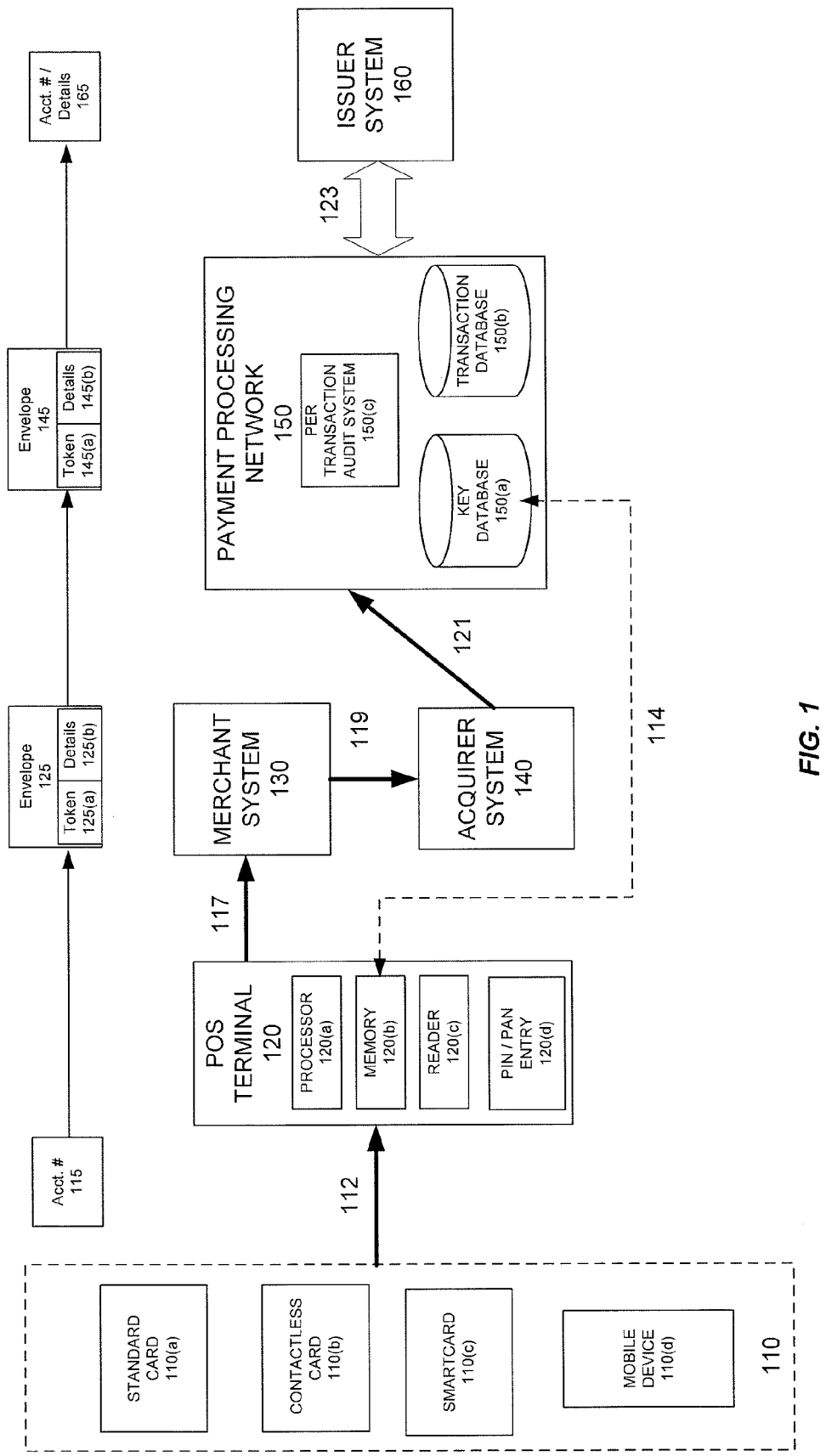
FIG. 1 shows a diagram of a system that utilizes embodiments of the disclosure.

Techniques for eliminating the need for merchants and acquirers to conduct Payment Card Industry ("PCI") security audit procedures are provided. The systems and methods disclosed herein make transactions processed through a payment processing network automatically PCI compliant, thereby removing the PCI audit process from the merchant, acquirer, and any other entity subject to the PCI audit process. In addition, the techniques provide other benefits to merchants, acquirers, and others subject to PCI compliance audits. For example, the internal fraud prevention costs are reduced because it is no longer necessary to conduct PCI compliance audits or ensure that systems are PCI compliant. Furthermore, the techniques do not require encryption/decryption at the host security modules ("HSM") for the merchant, acquirer, or issuer, although such encryption and decryption may still be provided for compatibility with legacy systems. Additionally, unlike prior systems in which PCI compliance audits occur at a discrete point in time, embodiments of the present disclosure allow for each individual transaction to be audited to ensure PCI compliance.

In order to provide a better understanding of the present disclosure, a brief review of transaction processing as it exists today is provided. For ease of discussion, a transaction conducted in a physical store is described, however it should be understood that similar steps occur in any type of transaction, including online transactions. In a typical transaction, a consumer will select goods or services to purchase. The consumer will then pay for the goods or services by presenting a transaction card, such as a debit or credit card, to the merchant. The merchant may then swipe the transaction card through a Point of Sale ("POS") terminal to read the account number from the transaction card.

The POS terminal may then send the account number to a merchant system, where other information related to the transaction, such as purchase amount, may be added. It should be noted that in some cases, the POS terminal and the merchant system are a single device, in which the account number is read, and the purchase amount is keyed in by the merchant. The transaction details, such as the account number and purchase amount are then sent from the merchant system to an acquirer system to request transaction authorization. An acquirer is generally a bank that holds an account for the merchant in which funds resulting from the transaction will eventually be deposited.

The acquirer system then receives the transaction details, and determines a payment processing network that will process the transaction. The acquirer routes the transaction to the appropriate payment processing network, which in turns determines the issuer of the transaction card. As mentioned above, an issuer may provide the consumer with an account that holds cash or a line of credit. The payment processing network then routes the transaction to the correct issuer for a transaction authorization decision. If the consumer has sufficient funds in the account or sufficient available credit, the issuer will authorize the transaction. The authorization response is transmitted back to the merchant, through the payment processing network, the acquirer, and the merchant system. The consumer has then completed the purchase of the goods or services. At a later point in time, a settling and clearing process may occur, in which the funds are actually transferred from the consumer's account (or drawn on the line of credit) to the merchant's account at the acquirer. The settlement and clearing process occurs using the account number, wherein a request for funds may be compared to a previous authorization, and if an authorization exists, the funds are transferred.

Transactions may become even more complicated when a Personal Identification Number ("PIN") is required. For example, in the case of some debit card transactions, a PIN must be entered by the consumer. The PIN is typically entered into the POS terminal in clear form by the consumer. The PIN is then encrypted using a Pin Encryption Key (PEK) in the POS terminal and is sent to a merchant system, which also knows the PEK. The merchant system, then decrypts the PIN using the PEK, and encrypts it again using an acquirer working key (AWK), which is a key known by the merchant and the acquirer. The acquirer then decrypts the PIN using the AWK and encrypts again using a payment processor key. The payment processor in turn decrypts the PIN and encrypts using an issuer working key. The issuer then decrypts the PIN and determines if the PIN is correct.

Although PCI standards require that all of the encryption/decryption described above occur in Host Security Modules ("HSM"), which should never expose the PIN in a clear form, there is still the expense associated with maintaining the multiple HSMs. Furthermore, each HSM would then need to be audited to ensure that it is operating in compliance with PCI standards, thus adding another cost for PCI DSS compliance.

As should be clear from the description above, there are many opportunities for a consumer's account information to be compromised. Data breaches at merchants and acquirers are becoming commonplace. Although the PCI DSS audit process attempts to reduce the likelihood of such a data breach, data breaches still occur. Embodiments of the present disclosure eliminate the need for merchants and acquirers to conduct PCI DSS compliance audits, thus reducing operating costs. Furthermore, transactions are all automatically PCI DSS compliant, thus ensuring that consumers' transaction account information remains secure.

FIG. 1 shows a diagram of a system 100 that utilizes embodiments of the disclosure. The system of FIG. 1 includes various types of transaction cards 110, a POS terminal 120, merchant system 130, acquirer system 140, payment processing network 150, and issuer system 160. Although only one of each of the previously mentioned elements is shown, this is for purposes of simplicity of explanation. In an actual operating system there can be any number of the elements described in FIG. 1.

Transaction cards 110 can come in many different forms and form factors. One simple example is a standard transaction card 110(a). Such a card may include an account identifier, such as an account number, embossed on the front of the card. The card may further include a magnetic stripe on the back which contains account information, such as the account identifier, in a form that is more easily readable by the POS terminal 120. Typically, a standard transaction card is a passive element and is read by an active element, such as the POS terminal 120. A standard transaction card is described in further detail with respect to FIG. 9.

Transaction cards 110 can also include contactless cards 110(b). Typically, a contactless card is similar to a standard card with the addition of a contactless element that allows the account information to be read from the card without the card coming into physical contact with a POS terminal 120. For example, a contactless card 110(b) may include an RFID element, which when energized by a POS terminal 120 causes the contactless card 110(b) to wirelessly transmit account information from the contactless card to the POS terminal 120. Contactless cards are described in further detail with respect to FIG. 10.

Yet another type of transaction card 110 is a smartcard 110(c). Unlike the standard card 110(a), a smartcard 110(c) can be an active element. The smartcard 110(c) may contain a processor and a memory and can perform processing tasks that would normally be done by the POS terminal 120 in the case of a standard card 110(a). In addition, smartcards 110(c) may operate in both a contact and a contactless mode. In a contact mode, the smartcard 110(c) is inserted into a POS terminal 120, which provides power to the processor and memory on the smartcard 110(c). Operation in the contactless mode is similar to the contact mode, except rather than being inserted into a POS terminal 120, the smartcard 110(c) is energized by the POS terminal 120, and communicates to the POS terminal wirelessly. A further description of smartcards 110(c) is provided with respect to FIG. 11.

Yet another type of transaction card is not really a card at all. A mobile device 110(d) may be configured to contain all of the functionality of any of the cards 110(a-c) described above. A mobile device 110(d) is described further with respect to FIG. 12. Although several exemplary types of transaction cards are described, this is for purposes of explanation and not limitation. Any transaction card, regardless of a particular form factor, are usable with embodiments of the disclosure. In some cases, an account may not be associated with a physical card or device, but rather is identified only by an account identifier. Embodiments of the invention are usable with any type of account identifier that can be used to identify an account.

System 100 can also include a POS terminal 120. POS terminal 120 may also be referred to simply as a terminal and may include a processor 120(a) and a memory 120(b) coupled to the processor. The memory may comprise computer instructions, which when executed by the processor 120(a) cause the processor to execute the functions that are described below. In addition, the memory 120(b) may also contain one or more keys, such as encryption keys. The key may allow the POS terminal 120 to encrypt data such that it can only be decrypted by an entity that possess a corresponding key. For example, the key may be part of a symmetric or asymmetric key pair. The corresponding key may be stored 114 in a key database 150(a) of a payment processing network 150, which will be described in further detail below. Thus, data encrypted by the POS terminal 120 may only be decrypted by the payment processing network 150.

The transaction data received at the POS terminal 120 can be encrypted using any number of encryption standards (e.g. DES, TDES with bundled keys, AES-128, AES-256, etc.). Furthermore, encryption/decryption can be performed by the POS terminal 120 using a symmetric or non-symmetric key. In one embodiment, the non-symmetric key is a public key with an optional private key. Additionally, any number of encryption algorithms can be used (e.g. RSA, ECC, etc.). In one embodiment, an encryption control signal (ECS) can be used to accommodate key signature sizes. It should be understood that any form of encryption that ensures that data encrypted by a first element can only be decrypted by a second element using associated keys would be suitable in embodiments of the disclosure.

The encryption key stored in a POS terminal 120 may be unique to that terminal. Each POS terminal 120 may have an identifier associated with it, and a specific key associated with that terminal identifier. Thus, when data encrypted by a POS terminal 120 is received by the payment processing network 150, the payment processing network utilizes the terminal identifier to determine the key associated with that particular POS terminal. The correct key can then be retrieved form the key database 150(a), and the encrypted data can be decrypted.

POS terminal 120 can also include a reader 120(c). The reader can be in any suitable form, such as a magnetic stripe reader to read data from standard cards 110(a), a contactless reader to energize and read data from contactless cards 110(b-d), or a contact reader to energize and read data from a smartcard 110(c). Reader 120(c) can be in any suitable form to read account identification information from any suitable transaction card 110. POS terminal 120 may also include a PIN/PAN entry device 120(d). For transaction that require the use of a PIN, the consumer may key his PIN into the PIN/PAN entry device 120(d). In some cases, such as with a damaged transaction card, it is necessary for the account identifier, which can be referred to as a primary account identifier (PAN), to be entered manually. The PIN/PAN entry device 120(d) may be used for this purpose.

In operation, a consumer may present 112 his transaction card 110 to a POS terminal 120 in a conventional manner. For example, in the case of a standard card 110(a), the consumer may hand his transaction card 110 to an employee of the merchant who swipes the transaction card through the POS terminal reader 120(c). The processor 120(a) in the POS terminal reads the account identifier 115 from the transaction card. The processor then generates a token 125(a) that is based on the account number as well as the key that is associated with the terminal. What should be understood is that because the token 125(a) is generated based on the key associated with the terminal, the payment processing network 150 which also has access to the key, can convert the token back into the account identifier.

The token 125(a) may include account identifiers that are similar in format to a consumer's real account identifier. For example, if an account identifier contains nineteen digits, the token may also contain nineteen digits. In some embodiments, the token may be of any length or type as long as it resembles the format of an account identifier, such as a credit card number, debit card number, gift card number, and the like. For example, the token may resemble a gift card number that is twenty one digits in length, when the account identifier is nineteen digits long. The token may also be described using terms such as bogus, fake, decoy, substitute, or the like.

In some embodiments, the POS terminal 120 does not generate the token, but rather the token 125(a) is generated by the transaction card 110. For example, in the case of a smartcard 110(c), the POS terminal 120 may provide the key to the smartcard in a secure manner. The processor on the smartcard itself may generate the token and pass the token to the POS terminal 120. Again, what should be understood is that a token, which resembles an account identifier, is generated prior to processing a transaction. The token 125(a) can only be converted back into the account identifier by an entity that possess the key that is used to generate the token. Thus, as described, only the payment processing network 150 is able to convert the token back into the account identifier 115.

The POS terminal 120 may also obtain details related to the transaction, such as the transaction amount and the transaction date. Although two specific pieces of data are mentioned, it should be understood that this is for purposes of explanation, not limitation. A first portion of the transaction details may then be encrypted using the key associated with the POS terminal 120. For transactions that require a PIN, the PIN may be received from the consumer through the PIN/PAN entry device 120(d) and encrypted with the key associated with the POS terminal 120. The PIN and transaction data can only be recovered by an entity that also possess the key associated with the POS terminal 120. As is being described in FIG. 1, the PIN and transaction data can only be recovered by the payment processing network 150.

The token and the encrypted transaction data may then be passed 117 to a merchant system 130. In addition, an identifier associated with the POS terminal 120 may also be provided to the merchant system 130. The merchant system 130 may form an envelope 125 containing the token 125(a), the terminal identifier, and the terminal encrypted data 125(b). The merchant system 130 may also add additional information, such as the transaction amount and transaction date 125(b). Although inclusion of this duplicate set of transaction details may seem redundant, the purpose will become more clear below where the per transaction audit is described. A further description of the envelope 125 is provided with respect to FIG. 2.

At this point, the merchant system 130 may process the transaction using the token. Because the token is in a format that is similar to an account identifier, there is no need for the merchant to make any modifications to the conventional processing that was described above. The merchant system 130 can send 119 the envelope 125 to an acquirer system 140. The acquirer system then processes the token 125 just as if it were an account identifier. The acquirer determines the appropriate transaction processing network 150 to process the transaction based on the token.

What should be understood is that the merchant system 130 and the acquirer system 140 operate using the token 125(a), not the real account identifier. All processing that would normally be done by the merchant 130 and acquirer 140 continues just as it normally would, except that the token is used instead of the real account identifier. Because the token resembles an account identifier, both the merchant 130 and the acquirer are advantageously relieved from having to make any modifications to their systems in order to support embodiments of the disclosure.

Furthermore, the need for PCI DSS compliance by the merchant 130 and the acquirer 140 has been eliminated through the use of the token 125(a). As described above, the only entities that posses the keys necessary to convert the token into a real account identifier are the POS terminal 120 and the payment processing network 150. The token 125(a) is essentially worthless until it is converted back into the real account identifier. Thus, even if the merchant's 130 or acquirer's 140 systems are breached, and the tokens are obtained, the tokens themselves cannot be used for transactions because they are not real account identifiers. Because the merchant 130 and acquirer 140 systems no longer have the possibility of containing the real account identifier, there is no longer the need for PCI DSS compliance audits, thus advantageously relieving the merchant and the acquirer of the costs associated with those audits.

Even in the case of transactions requiring a PIN, there is still no need for PCI DSS compliance audits of the merchant 130 and acquirer 140. As described above, the PIN is encrypted using the key associated with the POS terminal 120. As such, only the payment processing network 150 is able to recover the clear form of the PIN. Because the conventional multiple PIN encryption/decryption steps described above can be eliminated, there is no need to audit the merchant 130 or acquirer 140 for proper PIN processing, because those entities are never in possession of the clear from of the PIN.

Although the description above describes a transaction that starts with a POS terminal 120 and goes through a merchant 130 and acquirer 140 system, embodiments of the invention are not so limited. In some embodiments, the POS terminal 120 may be directly connected to the payment processing network 150. An example of a terminal that can be used with the disclosed technology is the Merchant Direct Exchange ("MDEX") terminal from Visa™. This terminal creates a direct connection with the payment processing network 150 and can therefore bypass the acquirer 140.

The envelope 125 received by the merchant/acquirer can then be sent 121 to the payment processing network 150. The received envelope 145 again contains the token 145(a) and transaction details 145(b). The payment processing system may identify the POS terminal 120 that is conducting the transaction through a terminal identifier that is contained within the envelope 145. The payment processing system 150 may then perform a lookup of that terminal identifier in a key database 150(a) to retrieve the key associated with the POS terminal 120. Using this key, the payment processing network may convert the token back into the real account identifier.

The payment processing network 150 may comprise one or more transaction processing server computers to process transactions. Suitable server computers are described in further detail with respect to FIG. 8. The payment processing network 150 may then follow conventional transaction processing procedures. A second portion of the transaction details, such as the account identifier 165, along with transaction amount and other relevant data retrieved from envelope 145 may be sent 123 to the issuer 160 of the account identifier. The issuer 160 then determines if the transaction is authorized based on conventional factors, such as the amount in the associated account or credit available on a credit line. The authorization decision is then returned to the merchant 130 via the payment processing network 150 and acquirer 140.

Embodiments of the disclosure described thus far advantageously eliminate the need for merchants and acquirers to perform PCI DSS compliance audits. Because performing audits by merchants and acquirers is no longer necessary, embodiments of the disclosure advantageously allow the merchants and acquirers to reduce their operating costs. Furthermore, because there is no possibility for a data breach at a merchant or an acquirer exposing actual account identifiers, merchants and acquirers are advantageously relieved of any liability associated with such a breach.

Furthermore, embodiments of the disclosure enable a new form of audit, the per transaction audit. As described above, prior to the instant disclosure, PCI DSS compliance audits were a discrete event. For example, a merchant may conclude a compliance audit on one day and changes to the merchant's system on the next day may make the merchant no longer PCI DSS compliant. For example, a firewall protecting a merchant's systems may become inoperative. Such a failure would not be discovered until the next audit.

Embodiments of the present disclosure provide the ability to conduct per transaction audits. As mentioned above, a token is created by the POS terminal 120 using a key. The token can only be converted back to a real account identifier using an associated key. Thus, if a token is received by the payment processing network 150 and is able to be converted into a real account identifier using the key associated with the POS terminal 120, it can be assured that the POS terminal 120 is operating according to embodiments of the disclosure. Therefore, the real account identifier was never sent to the merchant or acquirer, meaning that for a particular transaction, the real account identifier was never exposed. As such, the individual transaction complies with PCI DSS standards, because the real account identifier is never exposed outside of the POS terminal 120.

Furthermore, as explained above, a key 114 is shared between the POS terminal 120 and the payment processing network 150. Data encrypted by the POS terminal 120 using the key can only be decrypted by the payment processing network 150. The POS terminal 120 has been described as including transaction related information that is encrypted using the key associated with the terminal in the envelope 125. This same data can be included in the envelope by the merchant's system 130, in an unencrypted form. At the payment processing network, the encrypted data can be decrypted and compared with the unencrypted data in the envelope. If the data matches, this indicates that the merchant or acquirer has not modified at least the portion of the data that was encrypted by the POS terminal 120.

For example, the POS terminal 120 may receive the amount of the transaction and the transaction date. The POS terminal 120 may then encrypt this data using the key associated with the POS terminal 120. The merchant system can also include this information in the envelope 145 that is sent to the payment processing network. A per transaction audit system 150(*c*) that may be included in the payment processing network 150 may then receive both the encrypted and unencrypted transaction details. The payment processing network 150, through the per transaction audit system 150(*c*), may decrypt the encrypted transaction amount and date and compare the data with the unencrypted transaction amount and date found in the envelope. If the data does not match, it means that somewhere between the POS terminal 120 and the payment processing system 150, the envelope was modified. Such a modification is likely a violation of the operating regulations of the payment processing network 150. Thus, if the comparison fails, the transaction is in violation of the operating procedures of the payment processing network, and the per transaction audit may fail.

In one embodiment, the per transaction audit system 150(*c*) may store the results of the per transaction audit in a transaction database 150(*b*). The transaction database 150(*b*) may simply store the pass/fail state of the per transaction audit for each transaction. In more complex embodiments, the transaction database 150(*b*) may store all data related to the transaction such that the exact reason for the failure of the per transaction audit is saved. The merchant may periodically receive reports of the pass/fail status of audits conducted on each transaction. If the number of failed per transaction audits associated with a merchant exceeds a threshold set by the payment processing network, corrective action may be taken. The threshold may be as low as a single per transaction audit failure, a certain number of failures, a certain percentage of failures, or any other criteria specified by the payment processing network 150.

In some cases, the corrective action may be as minor as requiring the merchant/acquirer to correct the source of the audit failure. For example, if a merchant's system 130 has an incorrect date set, the per transaction audit will fail, because the date according to the POS terminal 120 will never match that of the merchant 130. The merchant can simply be instructed to correct the date on his equipment.

In more severe cases, the failure of per transaction audits exceeding a payment processing network 150 defined threshold may cause the merchant's ability to use the payment processing network to be suspended. For example, if the transaction amount in the envelope 145 does not match the unencrypted transaction amount as specified by the POS terminal 120, this indicates a significant problem. The merchant's or acquirer's system is altering the transaction amount such that it is different form the transaction amount as specified by the POS terminal, which could indicate fraudulent activity. Such an indication may result in the suspension of a merchant's transactions until the source of the per transaction audit failure is discovered and corrected.

Although the above description of per transaction audits is in terms of audits performed periodically, such as once a month, embodiments of the disclosure are not so limited. In some embodiments, the per transaction audit system 150(*c*) operates in real time in conjunction with obtaining authorization for a transaction from an issuer. For example, prior to requesting authorization for a transaction from an issuer, a per transaction audit can be conducted. If the per transaction audit fails, the payment processing network may determine that the transaction is fraudulent, and thus automatically decline the transaction without querying the issuer.

In other embodiments, failing a per transaction audit may not cause the transaction to automatically be declined. The payment processing network typically charges the merchant a fee for processing the transaction. In some embodiments, the payment processing network 150 may provide a discount to the merchant for transactions that pass the per transaction audit. Thus it is in the merchant's own interest to ensure that all transactions pass the per transaction audit.

Discounted per transaction pricing can also be used to incentivize the merchant to move from traditional card processing to card processing as described in the instant disclosure. The merchant advantageously reduces the costs of doing business, not only by eliminating the necessity to perform PCI DSS compliance audits, but also from the discounted transaction fees associated with successful per transaction audits. Although discounted fees have been described, it should be understood that a particular payment structure is left to the payment processing network. For example, instead of a discount for transactions that pass a per transaction audit, an increased fee could be charged for transactions that fail a per transaction audit.

As described above, the elimination of PCI DSS compliance audits and the per transaction audit rely on the fact that tokens generated by the POS terminal 120 can only be converted into account identifiers by the payment processing network 150. Likewise, data encrypted by the POS terminal 120 can only be decrypted by the payment processing network 150. To ensure that this is the case, the payment processing network may periodically audit the manufacturers of the POS terminals to ensure that the terminals operate as described above. For example, the POS terminal manufacturer may be audited to ensure that the software used to generate the token is secure and does not reveal the real account identifier outside the POS terminal itself. Furthermore, the POS terminal manufacturer can be audited to ensure that the encryption performed on the transaction details is such that the data is not available outside of the POS terminal.

As long as the POS terminal manufacturer is audited to ensure that the POS terminal will behave as described above, there is no need for merchant and acquirer PCI DSS audits. Furthermore, auditing the manufacturer of the POS terminal advantageously relieves the payment processing network from having to audit each individual POS terminal. If the manufacturer is audited as producing compliant terminals, then there is no need to individually audit each POS terminal that is deployed, as the compliance of the terminal has already been verified. Furthermore, because the manufacturer of the terminal has no access to account identifiers, there is no possibility that a data breach in the manufacturer's system can result in exposure of account identification information.

Periodically, typically at the end of the day, a clearing and settlement process may occur. During the clearing and settlement process, the merchant 130 submits all authorized transactions to the payment processing network 150 for payment. The payment processing network 150 then facilitates the transfer of funds from the consumer's account, through the issuer, to the merchant's account. The settlement and clearing process is generally unchanged when embodiments of the present disclosure are implemented. The main difference is that rather than using the account identifier to identify transactions, the token is used. The payment processing network is able to convert the token to the real account identifier as described above prior to engaging in the settlement and clearing process with the issuer.

Figure 2:
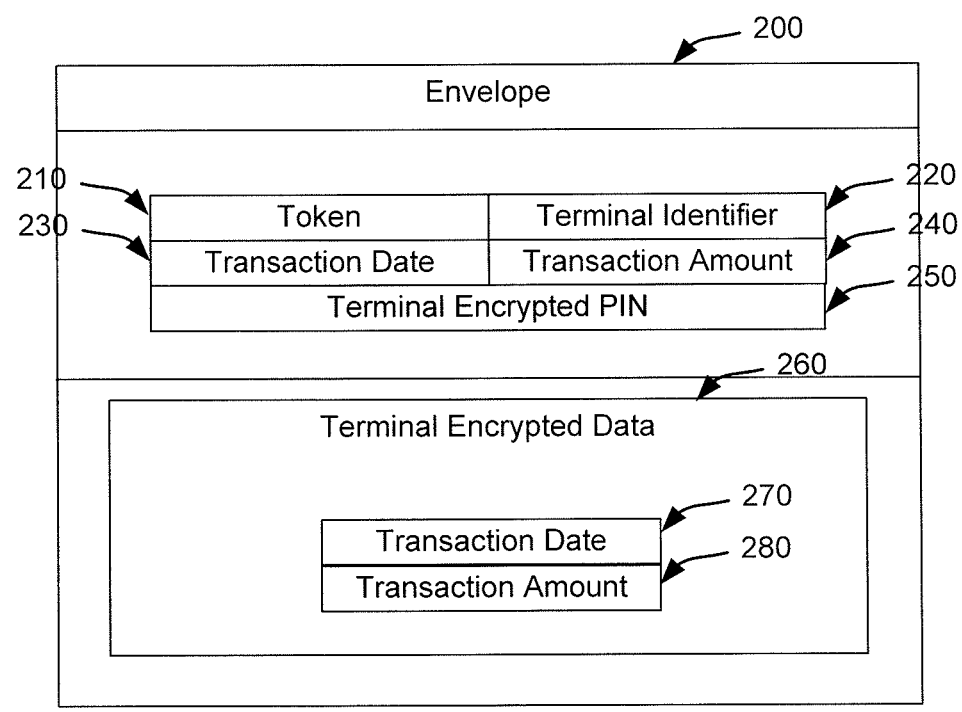
FIG. 2 shows exemplary data included in an envelope.

FIG. 2 shows exemplary data included in an envelope. The data included in the envelope 200 of FIG. 2 is merely exemplary and is not intended to be limiting. Any additional data, available to either the merchant or POS terminal could also be included in envelope 200. Envelope 200 may include the token 210 that is generated or received by the POS terminal. As described above, the token is associated with the real account identifier. The token may be derived from the key associated with the terminal and the account identifier. The token may be in a format that is similar to a real account identifier. Thus, any systems, such as merchant and acquirer systems, can process the token just as if it were an account identifier, advantageously allowing the merchant and acquirer systems to remain unchanged when embodiments of the disclosure are implemented. In addition, the envelope may include a terminal identifier 220. The terminal identifier may be used by a payment processing network to determine the specific POS terminal that generated the envelope 200. From this determination, the key associated with the terminal can be retrieved for the key database in order to decrypt any encrypted information contained in the envelope.

The envelope may also include unencrypted transaction details, such as the transaction date 230 and the transaction amount 240. As mentioned above, this data may be sent in an unencrypted form, and may be inserted into the envelope 200 by the terminal or the merchant. The unencrypted data may include the information that would be included in a transaction authorization request that was being processed absent embodiments of the present disclosure. The use of the unencrypted data will be described further below.

The envelope may also include a terminal encrypted PIN 250. As explained above, standard transaction processing requires multiple iterations of encrypting and decrypting a PIN. In the prior art, because the PIN appears in a clear form (at least within a HSM) this requires that the merchant and the acquirer be audited for PCI compliance. Embodiments of the present invention may include the PIN in a form that is encrypted by the terminal using the key that is shared with the payment processing network. The PIN may then be encrypted again by the merchant system using an AWK prior to sending to an acquirer, as described above. The acquirer can decrypt the AWK encrypted PIN and encrypt the PIN again using the payment processor key.

The payment processing system may then perform two levels of decryption. First, the PIN is unencrypted using the payment processor key. The result will be a PIN that is still encrypted with the terminal key. Because the payment processing network knows the terminal that generated the transaction and the key associated with that terminal, the payment processing network may then decrypt the key again, resulting in the PIN in a clear form. As should be understood, because the PIN is encrypted by the terminal using a key that is not know by the merchant or acquirer, the merchant or acquirer is unable to decrypt the PIN. Thus, the merchant or acquirer never has the PIN in a clear form.

Furthermore, because the terminal encrypted PIN may be in the same form as a clear PIN (e.g. same number of digits), the merchant, acquirer, and payment processing network may encrypt and decrypt the terminal encrypted PIN in a conventional manner. Thus the merchant and acquirer systems advantageously do not need to be modified to operate with embodiments of the present disclosure. Those systems continue to process the terminal encrypted PIN just as they normally would, without regard to the fact that the PIN being operated on is not a real PIN. Advantageously, only the payment processing network has access to the key associated with the terminal, thus the payment processing network is the only entity that can recover the PIN in a clear form.

Envelope 200 may also include terminal encrypted data 260. The terminal encrypted data may include at least a first portion of the transaction details. For example, the transaction date 270 and the transaction amount 280 may be received by the terminal, and optionally encrypted using the key associated with the terminal. Thus, the envelope may contain transaction details in an unencrypted form, and at least a first portion of those transaction details in an encrypted form. At the payment processing network, the transaction date 270 and transaction amount 280 can be decrypted because the payment processing network knows the key that is associated with the terminal. The transaction date 270 can be compared with the unencrypted transaction date 230 and the transaction amount 280 can be compared with the unencrypted transaction amount 240. If these items are not equal, it means that the unencrypted data within the envelope has been modified at some point. This can provide an indication of fraudulent activity or, at a minimum, that the merchant or acquirer is not complying with the operating regulations of the payment processing network. Thus, if the encrypted and unencrypted elements do not match, the per transaction audit may fail.

Although two specific pieces of data, the transaction date 230, 270 and transaction amount 240, 280 are described, this is for purposes of explanation and not limitation. Any data that is included in a normal transaction message could also be used. Furthermore, embodiments of the disclosure are not limited to encrypting individual data elements. For example, the POS terminal may take all of the data in the envelope 200 and create a hash value, such as a hashed message authentication code ("HMAC") using the key associated with the terminal, and include this code in the envelope. The payment processing system can then perform the same computation as it is aware of the key associated with the terminal. If the HMAC computed by the payment processing network does not match that included in the envelope, it means that the envelope has been modified. Again, such a modification could result in failure of the per transaction audit.

Although a hash value, such as the HMAC is described, embodiments of the invention are not limited to an HMAC. Any suitable hash function, such as cryptographic hash functions, have also been contemplated. In general, a suitable hash function is a deterministic procedure that takes an arbitrary block of data and returns a fixed or variable sized value. Any accidental or intentional change to the arbitrary block of data will change the hash value. Thus, the hash value can be used to determine if the block of data has been modified after the initial hash value was computed. Some exemplary hash functions include the Secure Hashing Algorithm (SHA-0, SHA-1, etc) family of algorithms, the Message Digest (MD2, MD4, MD5, etc.) family of algorithms, and any other suitable algorithms.

In general, any algorithm that follows the following four principles has been contemplated. First, the algorithm should be relatively easy to compute by the terminal and payment processing network. Second, it should be infeasible to reconstruct the arbitrary block of data given the hash value. Third, it should be infeasible to modify the arbitrary block of data without also changing the hash value. Finally, it should be infeasible to find two different messages with the same hash value. It should be noted that although some hash functions may depend on a key to be shared between the terminal and payment processing network, other hash functions do not require such a key.

Thus, the hash value can serve as a digital watermark for an arbitrary block of data. The watermark can be included in the envelope, and if the watermark computed by the payment processing network does not match that which is included in the envelope, this indicates the envelope may have been modified. Such a modification could result in the failure of the per transaction audit.

As described above, the watermark can be computed over any arbitrary block of data. Thus, embodiments of the invention are not limited to computing the watermark over the entire envelope, or specific fields within the envelope, as described above. Any arbitrary selection of data, as long as it is known by both the terminal and the payment processing network, can be used to compute the watermark. For example, at a low level, the envelope will consist of a series of bytes representing the data elements in the envelope. The terminal and payment processing network may determine the data that will be used to compute the watermark. For example, the first half of the bytes, the last half of the bytes, every other byte, every third byte, etc. may be used to compute the watermark. The terminal and the payment processing network will then each compute the watermark using the agreed upon envelope contents. If the watermarks do not match, this indicates that the envelope was modified. In some embodiments, it may not matter exactly which portion of the envelope was modified, as any modification to the envelope may result in a failure of the per transaction audit.

Furthermore, embodiments of the invention are not limited to a single watermark, and in fact any number of watermarks has been contemplated. In some cases, certain elements within the envelope, such as the transaction amount, may be considered more important than other elements, such as the transaction date. The terminal may compute a first watermark using the more important data, while a second watermark is computed using the less important data. Both of these watermarks can be included in the envelope. The payment processing network may then compute the watermarks using the determined portions of data in the envelope. If the first watermark for the more important data does not match that which is included in the envelope, this could be used to indicate a more important failure. A more important failure may result in a failure of the per transaction audit which could cause the transaction to be denied. If the second watermark does not match, this could indicate a less important failure. The transaction may be allowed to proceed, but the payment processing network may note that the per transaction audit was not completely successful.

Figure 3:
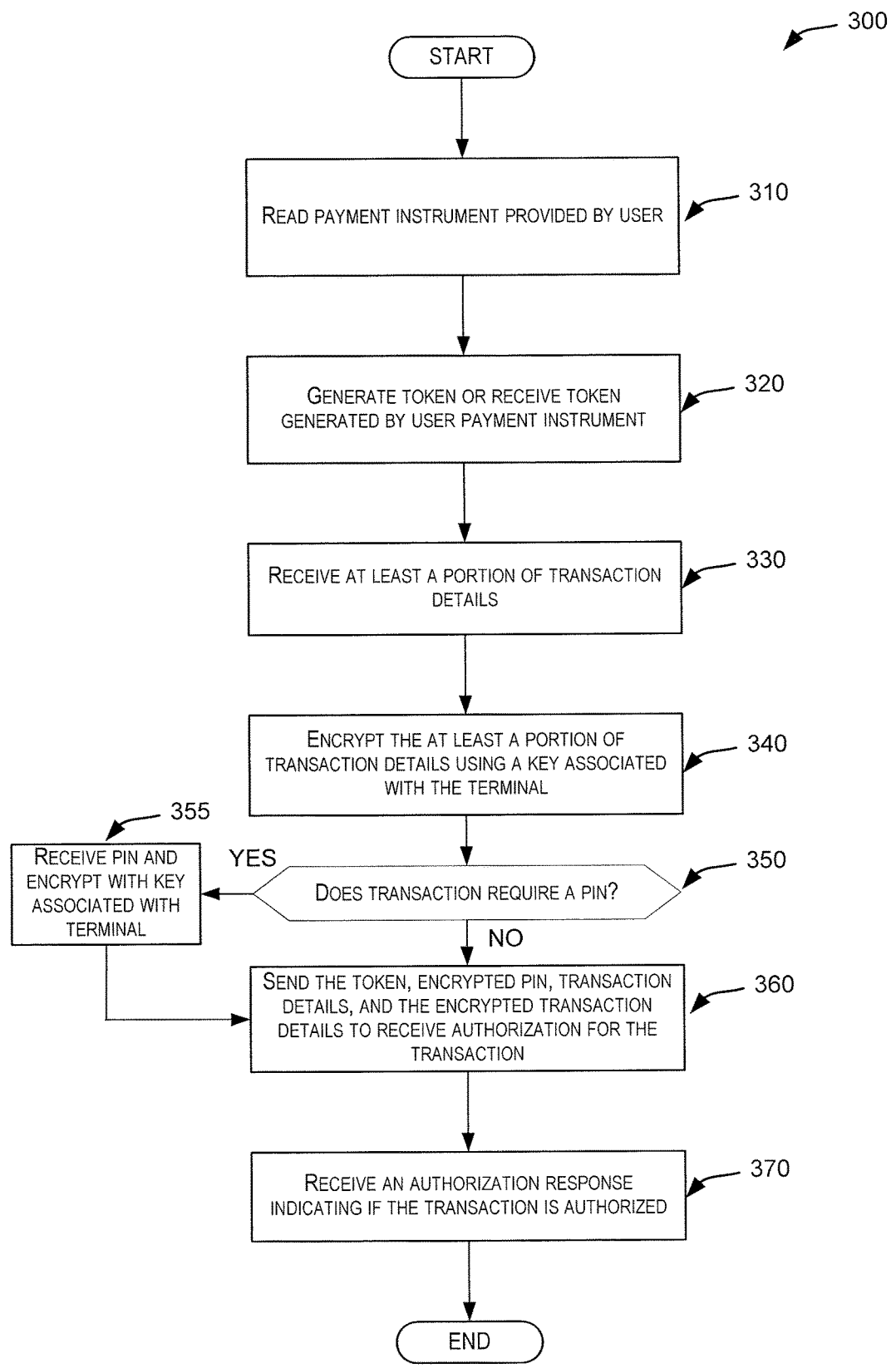
FIG. 3 shows a simplified flow chart from the perspective of a payment terminal.

FIG. 3 shows a simplified flow chart from the perspective of a payment terminal. The process 300 may begin at step 310, wherein the payment instrument is provided by a user to a POS terminal. As explained with reference to FIG. 1, the payment instrument can take many forms, including standard cards, contactless cards, contact and contactless smartcards, mobile devices, etc. The process then continues on to step 320, in which a token is received or generated.

As explained above, in some embodiments the payment instrument is a passive device. The account identifier may be provided to the terminal, and the terminal, using the associated key will generate a token. In other embodiments, such as when the payment instrument is a smartcard, the payment instrument itself may generate the token operating in conjunction with the terminal and the key associated with the terminal. In either case, the result of step 320 is that a token associated with the payment instrument is produced.

In step 330, at least a portion of transaction details may be received by the terminal. For example, as described with reference to FIG. 2, the terminal may receive transaction data such as the transaction amount. At step 340, the at least a portion of transaction data may be encrypted by the terminal using the key associated with the terminal. This will result in transaction data that is encrypted, and which can only be decrypted by the payment processing network.

At step 350, it is determined if the transaction requires a PIN. If so, the process moves to step 355 wherein the PIN is requested from the user and received in a clear form. The PIN can then be encrypted using the key associated with the terminal. Regardless of if the transaction requires a PIN, the process moves on to step 360 in which the token, encrypted PIN (if needed), transaction details, and encrypted transaction details are sent to the merchant system to request authorization of the transaction. As mentioned above, in some embodiments, the terminal is directly connected to the payment processing network so the transaction information is sent directly to the payment processing network as opposed to a merchant or acquirer.

At step 370, an authorization response is received, indicating if the transaction is approved or denied. In the case of an approval, the response may include an authorization code that will later be used by the merchant in the settling and clearing process. In the case of a denial, the response may include a reason for the denial, such as a failure of a per transaction audit.

Figure 4:
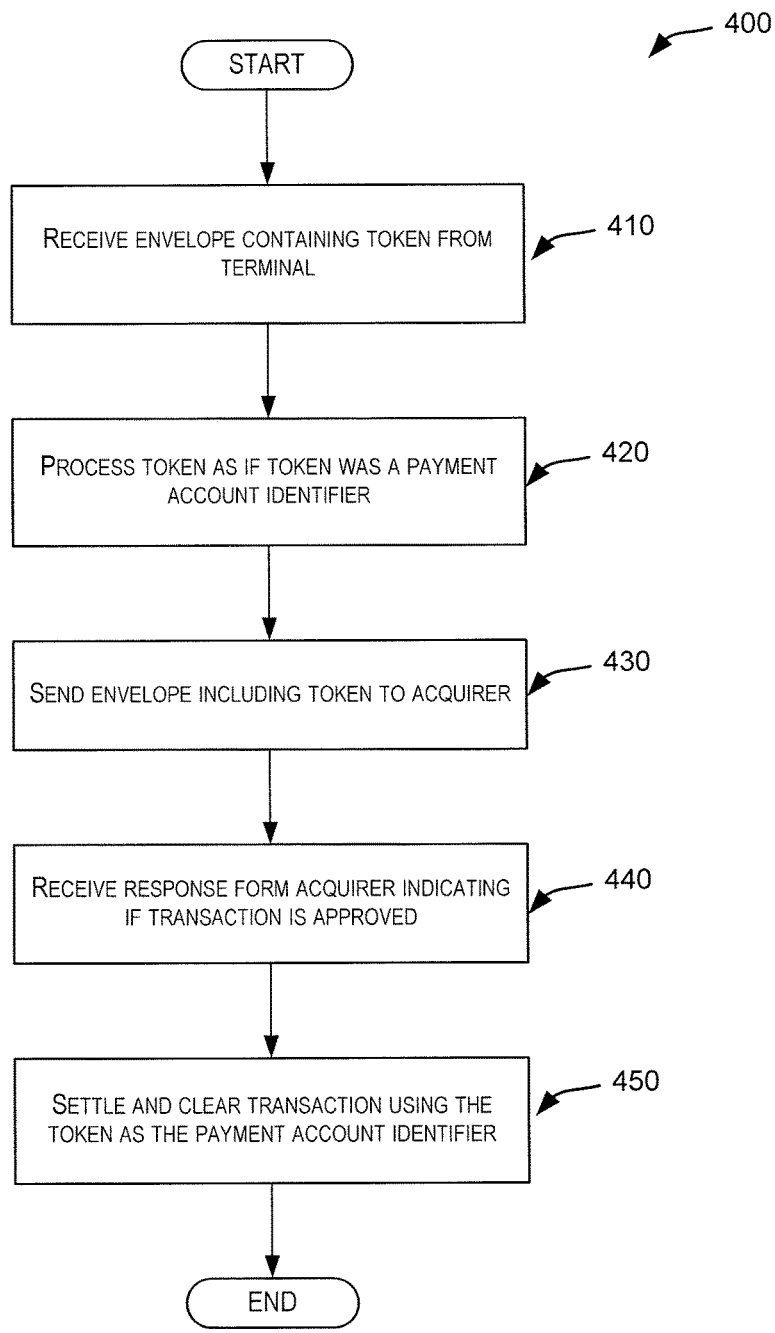
FIG. 4 shows a simplified flow chart from the perspective of a merchant system.

FIG. 4 shows a simplified flow chart from the perspective of a merchant system. As has been described above, embodiments of the disclosure advantageously do not require the merchant to make any modifications to the merchant systems. Thus, merchant processing is for the most part conventional. The process 400 may begin at step 410 wherein the envelope containing the token is received from the terminal. At step 420, the token is processed by the merchant system just as if it were a real account identifier. Thus, merchant processing is independent of implementation of embodiments of the disclosure.

At step 430, the envelope may be sent to an acquirer. At step 440, a response is received form the acquirer, indicating if the transaction is approved or denied. Just as above, the response may include an authorization code if the transaction is approved and a reason for denial if the transaction is not authorized. For example, the transaction may be declined because the per transaction audit failed. At step 450, the merchant may engage in a settlement and clearing process to receive the funds associated with the transaction. The merchant will simply use the token instead of the real account identifier for this purpose. As explained above, use of the token is transparent to the merchant, because to the merchant, the token appears exactly the same as a real account identifier.

Figure 5:
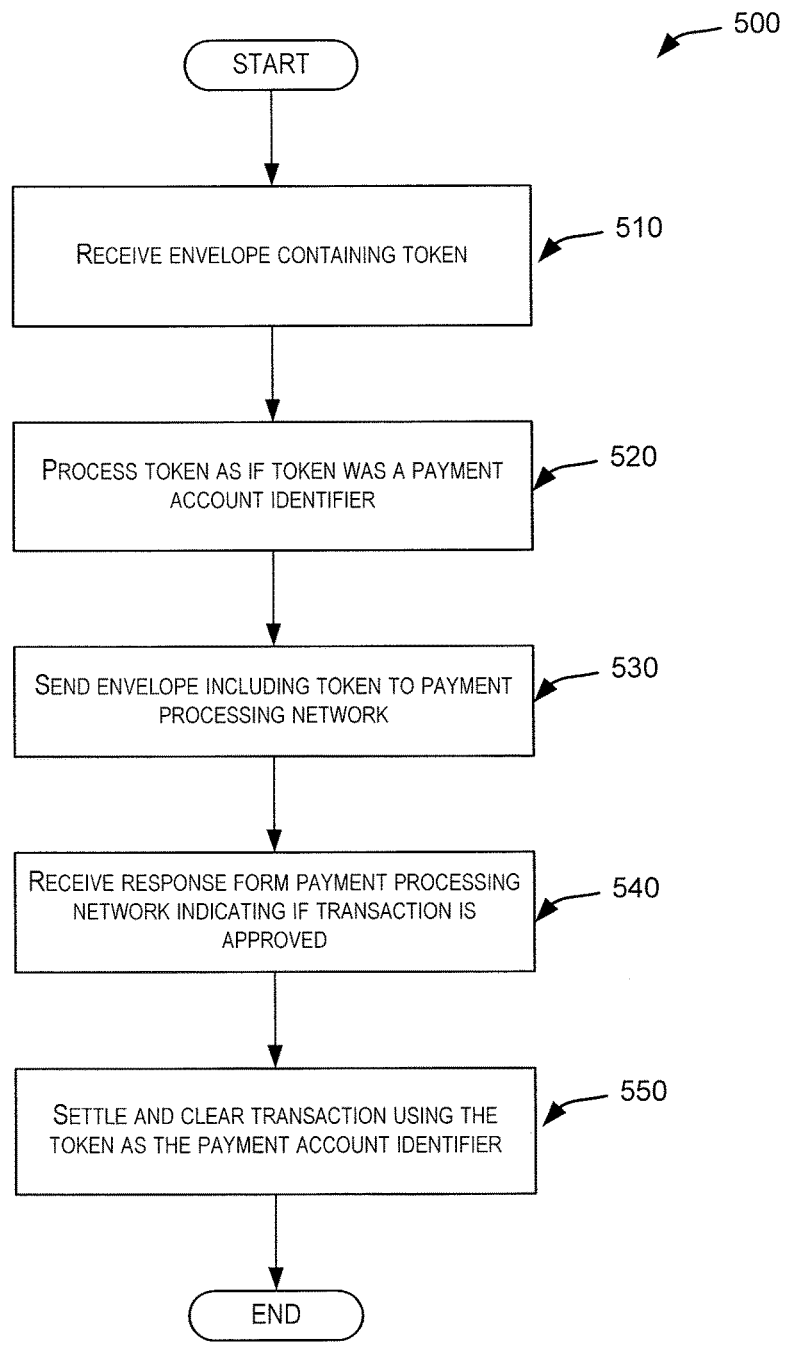
FIG. 5 shows a simplified flow chart from the perspective of an acquirer.

As described in FIGS. 4 and 5, merchant and acquirer processing is advantageously unaffected by embodiments of the present invention. Both merchants and acquirers do not need to modify their systems in order to implement embodiments of the invention, thus minimizing the costs associated with implementing embodiments of the invention. The merchant or acquirer simply processes a transaction authorization request that includes an envelope. The envelope can contain a least a portion of transaction details in both an encrypted and an unencrypted format. The merchant or acquirer system may simply operate as normal, using the unencrypted portions of the transaction details, while ignoring the encrypted portions. The merchant or acquirer system may forward the authorization request to obtain authorization for the transaction with little to no impact on the merchants or acquirers systems.

FIG. 5 shows a simplified flow chart from the perspective of an acquirer. Again, embodiments of the disclosure advantageously do not require the acquirer to make any modifications to the acquirer systems. Thus, acquirer processing is for the most part conventional. The process 500 may begin at step 510, wherein the acquirer receives the envelope containing the token. At step 520, the token is processed just as if it were a real payment account identifier. At step 530, the envelope, including the token, is sent to a payment processing network. At step 540, a response is received indicating if the transaction is approved. Again, the response can include a reason for a denial. At step 550, the acquirer may settle and clear the transaction in a conventional manner, with the only difference being that the token is used instead of a real account identifier. As described above, no modifications are required to the acquirer systems, as the token appears to the acquirer to be a normal payment account identifier.

Figure 6:
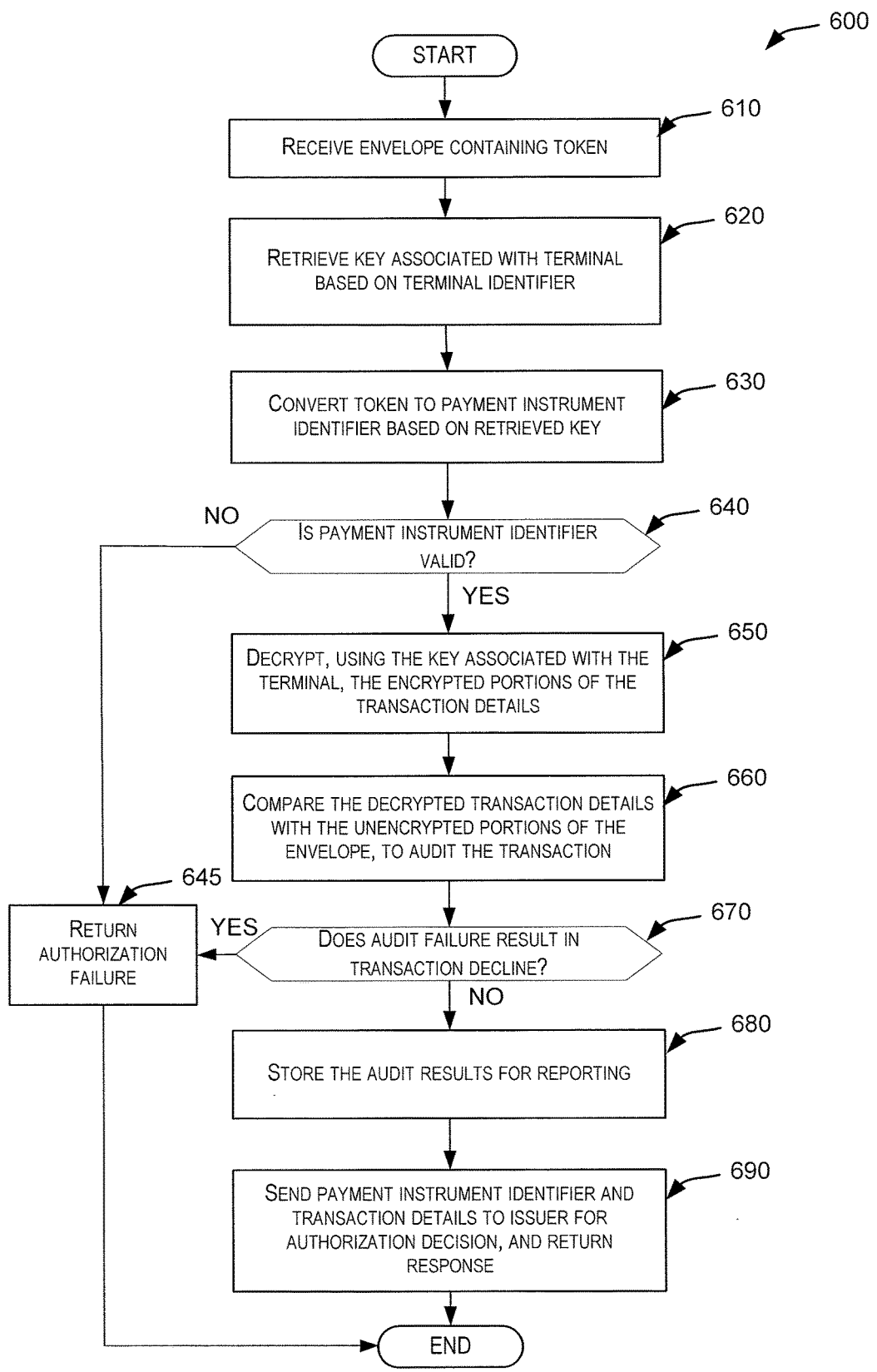
FIG. 6 shows a simplified flow chart from the perspective of a payment processing network.

FIG. 6 shows a simplified flow chart from the perspective of a payment processing network. The process 600 may begin at step 610, wherein an envelope containing a token is received. At step 620, the key associated with the terminal that produced the token is retrieved. As explained above, the envelope may contain a terminal identifier. This identifier can be used to determine the key that is associated with the terminal. At step 630, the token is converted back into a real account identifier.

At step 640, it is determined if the account identifier is valid. In some cases, an invalid account identifier can indicate the possibility of fraudulent activity. For example, if the token used in a prior transaction is compromised, and a later user attempts to reuse the token, either with the same or a different terminal, the token will not properly convert into a real account identifier. This is because if a token is, for example, manually entered into a terminal, the terminal will create a new token based on the input token. When the reverse conversion is done at the payment processing network, the result will be the original compromised token. However, as explained above, a token is not a real account identifier. Thus, the compromised token will not be associated with a real account. The process then continues on to step 645, wherein the transaction is denied.

If the account identifier is valid, the process continues on to step 650 wherein the encrypted portions of the transaction details are decrypted using the key associated with the originating terminal. At step 660, the now decrypted transaction details can be compared with the unencrypted portions of the envelope to audit the transaction. At step 670, if an audit failure results in a transaction decline, the process goes to step 645, wherein the transaction is declined. At step 680, the results of the audit are stored for reporting to the merchant. Furthermore, the results of the audit can also be used to determine the per transaction pricing charged to the merchant based on the results of the audit.

At step 690, the payment account identifier, along with the transaction details are sent to the issuer to determine if the transaction is authorized or declined. The response is then communicated back to the merchant in a conventional manned.

Figure 7:
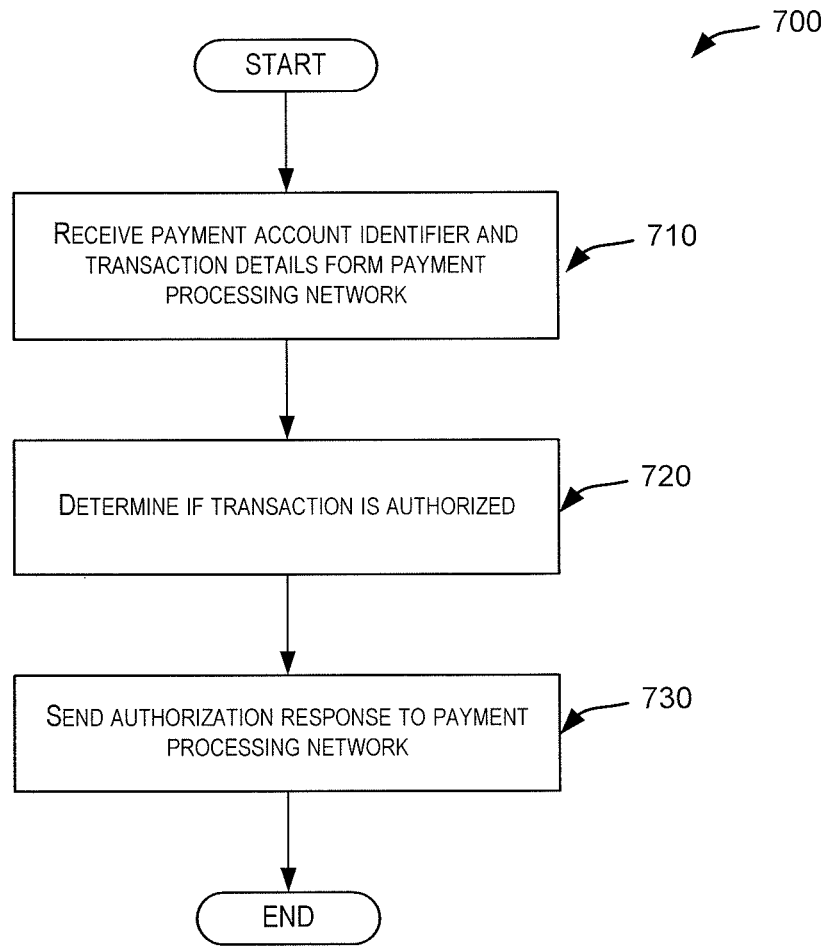
FIG. 7 shows a simplified flow chart from the perspective of an issuer.

FIG. 7 shows a simplified flow chart from the perspective of an issuer. Again, embodiments of the disclosure advantageously do not require the issuer to make any modifications to the issuer systems. The process 700 begins at step 710, wherein a payment account identifier and transaction details are received from the payment processing network. At step 720, the issuer determines if the transaction is authorized. At step 730, the authorization response is sent to the payment processing network, which will communicate the response back to the merchant, as described above.

Figure 8:
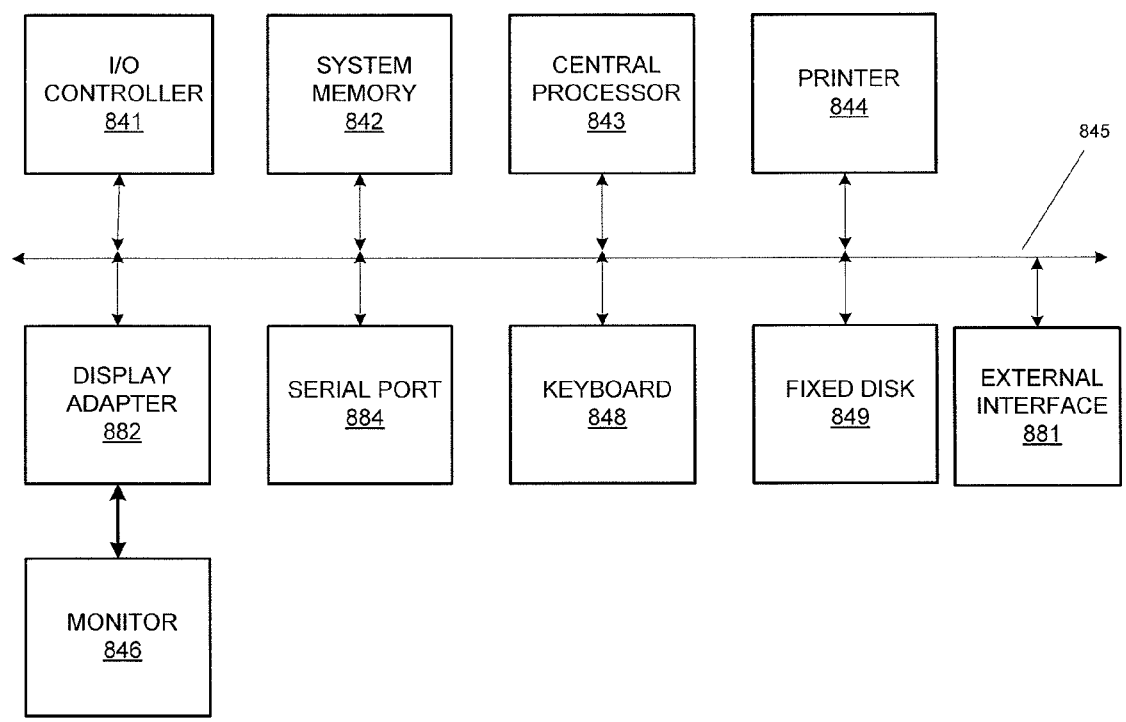
FIG. 8 shows a high level block diagram of a computer system that may be used to implement elements of the system.

FIG. 8 is a high level block diagram of a computer system that may be used to implement any of the entities or components (e.g., merchant system 130, POS terminal 120, acquirer system 140, a payment processing network 150, per transaction audit system 150(*c*) issuer system 160, etc.) described above. The subsystems shown in FIG. 8 are interconnected via a system bus 845. Additional subsystems such as a printer 844, keyboard 848, fixed disk 849, monitor 846, which is coupled to display adapter 882, and others are shown. Peripherals and input/output (I/O) devices, which couple to I/O controller 841, can be connected to the computer system by any number of means known in the art, such as serial port 884. For example, serial port 884 or external interface 881 can be used to connect the computer apparatus to a wide area network such as the Internet, a mouse input device, or a scanner. The interconnection via system bus 845 allows the central processor 843 to communicate with each subsystem and to control the execution of instructions from system memory 842 or the fixed disk 849, as well as the exchange of information between subsystems. The system memory 842 and/or the fixed disk 849 may embody a non-transitory computer readable medium which contains instructions that cause the processor to execute the methods described herein.

Additional embodiments of the invention have also been contemplated. An exemplary method may be directed to the terminal, and whose description follows. A method of using a terminal comprising: receiving, at a terminal, an account identifier; generating a token associated with the account identifier using a key associated with the terminal, wherein the key is accessible by a transaction processing server computer; receiving at least a portion of transaction details; encrypting the at least a portion of transaction details using the key; and sending the token and the at least a portion of encrypted transaction details to the transaction processing server computer, wherein the transaction processing server conducts an audit of the transaction.

An exemplary terminal's description follows. A terminal comprising: a processor; and a memory coupled to the processor, the memory storing instructions thereon, which when executed by the processor cause the processor to: receive, at the terminal, an account identifier; generate a token associated with the account identifier using a key associated with the terminal, wherein the key is accessible by a transaction processing server computer; receive at least a portion of transaction details; encrypt the at least a portion of transaction details using the key; and send the token and the at least a portion of encrypted transaction details to the transaction processing server computer, wherein the transaction processing server conducts an audit of the transaction.

Yet another embodiment may be directed to the transaction card holder, and whose description follows. A method of conducting a transaction comprising: providing an account identifier to a terminal, wherein the terminal generates a token associated with the account identifier using a key associated with the terminal, wherein the key is accessible by a transaction processing server computer, wherein the terminal the account identifier to a token using a key, wherein the terminal receives at least a portion of transaction details and encrypts the at least a portion of transaction details using the key, wherein the terminal sends the token and the at least a portion of encrypted transaction details to the transaction processing server computer, wherein the transaction processing server computer converts the token back into the account identifier using the key, wherein the transaction processing server computer decrypts the at least a portion of encrypted transaction details, wherein the transaction processing server computer conduits an audit of the transaction.

Figure 9:
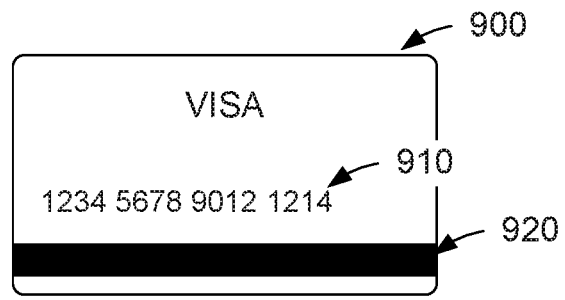
FIGS. 9-12 show high level block diagrams of exemplary payment instruments.

FIGS. 9-12 show high level block diagrams of exemplary payment instruments. FIG. 9 depicts a standard payment card 900. The payment card can be in the form of a plastic card. The payment card 900 may include an account identifier 910 that is embossed or printed on the front of the payment card. The payment card 900 may also include a magnetic stripe 920 that contains details about the account identifier and the account holder. For example, the magnetic stripe 920 may comprise the payment account identifier in a form that is readable by a POS terminal.

Figure 10:
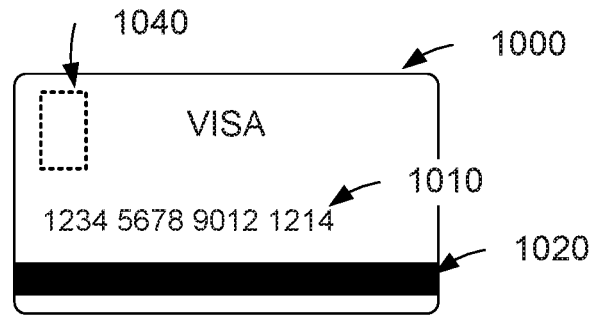

FIG. 10 depicts a contactless card. The same elements included in the standard card described with reference to FIG. 9 may also be included in contactless card 1000. In addition, contactless card 1000 may include an RF element 1040. When the RF element 1040 is placed within an electric field generated by a POS terminal, the RF element may cause data associated with the contactless card 1000 to be transmitted to the POS terminal. For example, the account identifier 1010 may be transmitted to the POS terminal.

Figure 11:
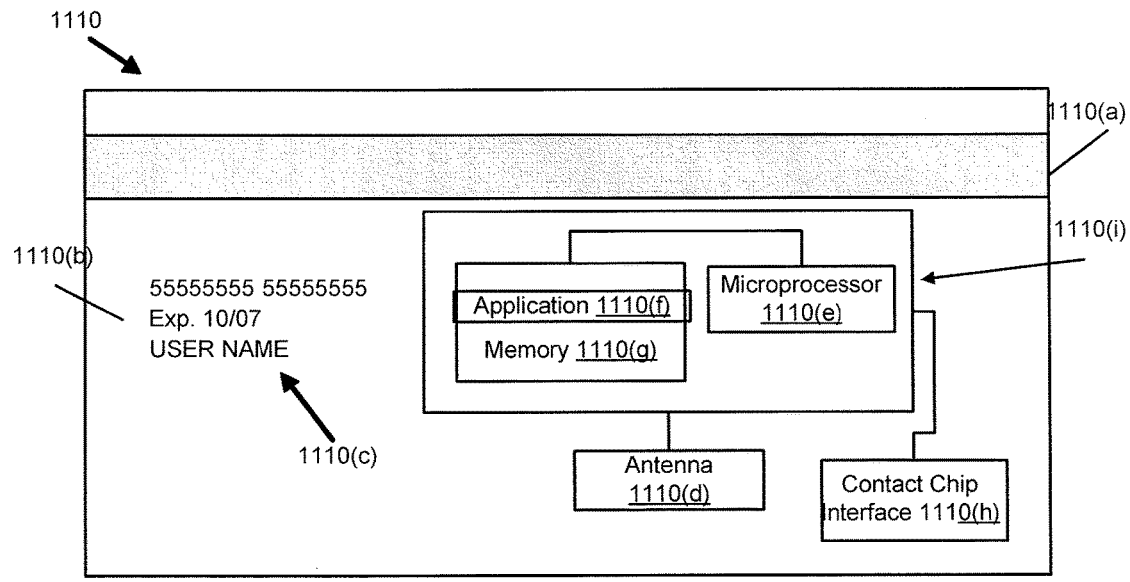

FIG. 11 provides an illustration of a smartcard in one embodiment of the invention. In such an embodiment, the smartcard may be in the form of a payment card, such as a credit card. The card may include a contact interface 1110(a), such as a magnetic stripe and/or other contact means, such as a contact chip plate 1110(h) capable of both reading and writing data stored within the memory 1110(g) or the magnetic stripe of the card. In addition, the card may include a contactless interface, which may comprise at an antenna 1110(d) coupled to an integrated circuit chip 1110(i) for wirelessly transmitting and receiving data stored on the card. The smartcard of FIG. 11 may include an account identifier associated with an account.

Figure 12:
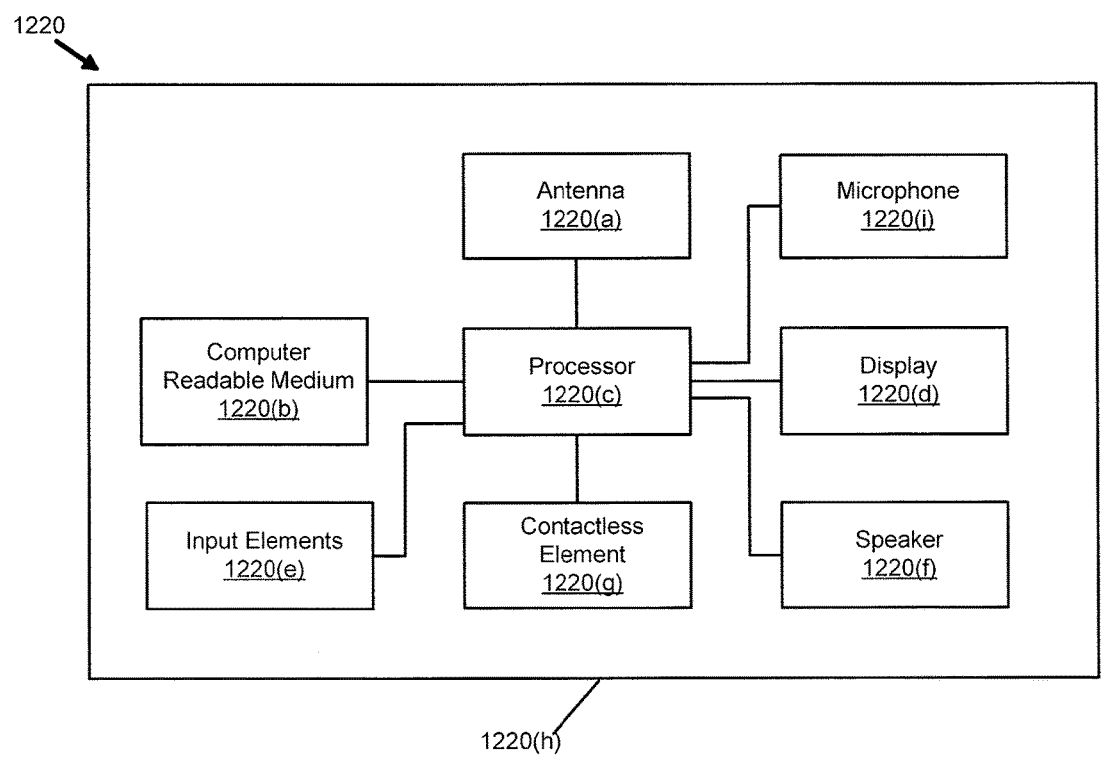

FIG. 12 shows a portable device 1220 in the form of cellular device, having a display 1220(d), keyboard interface 1220(e), memory 1220(b), processor 1220(c) and at least one antenna 1220(a). In addition, the cellular device may include a dual interface including both contact (not shown) and contactless interface 1220(g) for transferring information through direct contact or through an integrated chip, which may be coupled to an second antenna. In addition, the portable device may be capable of communicating through a cellular network, such as GSM through antenna 1220(a). Thus, the portable device may be capable of transmitting and receiving information wirelessly through both short range, radio frequency (RF) and cellular connections. The device of FIG. 12 may include an account identifier associated with an account.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A system comprising:
a key database; and
a transaction processing server computer coupled to the key database, wherein the transaction processing server computer comprises a processor and a non-transitory computer readable medium coupled to the processor, the non-transitory computer readable medium comprising code executable by the processor for implementing a method comprising:
receiving from a terminal, an envelope associated with a transaction, wherein the envelope includes unencrypted transaction details, a token derived from a key associated with a terminal and an account identifier, and at least a first portion of the transaction details in an encrypted format, the at least first portion of the transaction details encrypted using the key associated with the terminal, wherein the envelope further includes a hashed message authentication code computed using the key and the at least first portion of the unencrypted transaction details;
retrieving the key associated with the terminal from the key database;
converting the token to the account identifier using the key;
verifying that the account identifier is associated with a valid account; and
conducting an audit on the transaction, the audit ensuring that the envelope has not been modified between the terminal and the transaction processing server computer, wherein the audit includes decrypting the at least first portion of the transaction details and comparing the decrypted at least first portion of the transaction details with the unencrypted transaction details in the envelope associated with the transaction, and recalculating the hashed message authentication code using the key and the at least first portion of the unencrypted transaction details and comparing the recalculated hashed message authentication code with the hashed message authentication code received in the envelope.

2. The system of claim 1, wherein the audit is conducted as part of a transaction authorization, the transaction authorization resulting in a decline of the transaction if the audit does not pass.

3. The system of claim 1, wherein the method executable by the processor further comprises:
sending the account identifier and at least a second portion of transaction details to an issuer to determine if the transaction is authorized.

4. The system of claim 3, wherein settlement, clearing, and chargeback processes use the token, which is converted to the account identifier prior to sending to the issuer.

5. The system of claim 3 wherein the first and second portions of transaction details are the same.

6. The system of claim 1 wherein a fee charged by the transaction processing server computer for processing the transaction is dependent on the pass/fail status of the audit.

7. The system of claim 1 wherein the envelope includes a personal identification number associated with the account identifier, wherein the personal identification number is encrypted by the terminal with the key associated with the terminal and is decrypted by the transaction processing server computer.

8. The system of claim 1, wherein a failure of the audit does not cause the transaction to be declined.

9. A method comprising:
receiving, at a server computer, from a terminal, an envelope associated with a transaction, wherein the envelope includes unencrypted transaction details, a token derived from a key associated with a terminal and an account identifier, and at least a first portion of the transaction details in an encrypted format, the at least first portion of the transaction details encrypted using the key associated with the terminal, wherein the envelope further includes a hashed message authentication code computed using the key and the at least first portion of the unencrypted transaction details;
converting the token to the account identifier;
verifying that the account identifier is associated with a valid account; and
conducting an audit on the transaction, the audit ensuring that the envelope has not been modified between the terminal and the server computer, wherein the audit includes decrypting the at least first portion of the transaction details and comparing the decrypted at least first portion of the transaction details with the unencrypted transaction details in the envelope associated with the transaction, and recalculating the hashed message authentication code using the key and the at least first portion of the unencrypted transaction details and comparing the recalculated hashed message authentication code with the hashed message authentication code received in the envelope.

10. The method of claim 9, wherein the audit is conducted as part of a transaction authorization, the transaction authorization resulting in a decline of the transaction if the audit does not pass.

11. The method of claim 9 wherein a failure of the audit does not cause the transaction to be declined.

12. The method of claim 9, further comprising:
sending the account identifier and at least a second portion of transaction details to an issuer to determine if the transaction is authorized.

13. The method of claim 12 wherein the first and second portions of transaction details are the same.

14. The method of claim 12, wherein settlement, clearing, and chargeback processes use the token, which is converted to the account identifier prior to sending to the issuer.

15. The method of claim 9 wherein the envelope includes a personal identification number associated with the account identifier, wherein the personal identification number is encrypted by the terminal with the key associated with the terminal and is decrypted by the server computer.

16. The method of claim 9 wherein a fee charged by the server computer for processing the transaction is dependent on the pass/fail status of the audit.

* * * * *